(12) United States Patent
Furht et al.

(10) Patent No.: US 12,101,497 B2
(45) Date of Patent: Sep. 24, 2024

(54) ADAPTIVE RESOLUTION MANAGEMENT SIGNALING

(71) Applicant: OP Solutions LLC, Amherst, MA (US)

(72) Inventors: Borivoje Furht, Boca Raton, FL (US);
Hari Kalva, Boca Raton, FL (US);
Velibor Adzic, Boca Raton, FL (US)

(73) Assignee: OP Solutions, LLC, Amherst, MA (US)

( * ) Notice: Subject to any disclaimer, the term of this patent is extended or adjusted under 35 U.S.C. 154(b) by 0 days.

(21) Appl. No.: 18/087,963

(22) Filed: Dec. 23, 2022

(65) Prior Publication Data

US 2023/0129532 A1  Apr. 27, 2023

Related U.S. Application Data

(63) Continuation of application No. 16/948,117, filed on Sep. 3, 2020, now abandoned, which is a continuation
(Continued)

(51) Int. Cl.
*H04N 19/00* (2014.01)
*H04N 19/105* (2014.01)
(Continued)

(52) U.S. Cl.
CPC ........... *H04N 19/44* (2014.11); *H04N 19/105* (2014.11); *H04N 19/132* (2014.11);
(Continued)

(58) Field of Classification Search
CPC .... H04N 19/44; H04N 19/105; H04N 19/132; H04N 19/176; H04N 19/186; H04N 19/30
See application file for complete search history.

(56) References Cited

U.S. PATENT DOCUMENTS

| 2007/0160153 | A1* | 7/2007 | Sullivan | ........... H04N 19/61 375/E7.193 |
| 2008/0232452 | A1 | 9/2008 | Sullivan | |

(Continued)

FOREIGN PATENT DOCUMENTS

| WO | 2015140391 A1 | 9/2015 |
| WO | 2019059721 A1 | 3/2019 |

(Continued)

OTHER PUBLICATIONS

Choi et al. "AHG8: Signaling and Filtering for Reference Picture Resampling". Jul. 2019. (Year: 2019).*
(Continued)

*Primary Examiner* — Zhihan Zhou
(74) *Attorney, Agent, or Firm* — OP Solutions IP Department; Paul Ackerman

(57) ABSTRACT

A method includes receiving a bit stream; determining, using the bit stream, whether an adaptive resolution management mode is enabled; determining, using the bit stream, a scaling factor including a vertical scaling constant component and a horizontal scaling constant component; and reconstructing pixel data of a current block in adaptive resolution management mode and using the determined scaling factor, the reconstructing including scaling the current block horizontally by the horizontal scaling constant component and scaling the current block vertically by the vertical scaling constant component. Related apparatus, systems, techniques and articles are also described.

6 Claims, 8 Drawing Sheets

Related U.S. Application Data of application No. PCT/US2020/045170, filed on Aug. 6, 2020.

(60) Provisional application No. 62/883,459, filed on Aug. 6, 2019.

(51) Int. Cl.
*H04N 19/132* (2014.01)
*H04N 19/176* (2014.01)
*H04N 19/186* (2014.01)
*H04N 19/30* (2014.01)
*H04N 19/44* (2014.01)

(52) U.S. Cl.
CPC ......... *H04N 19/176* (2014.11); *H04N 19/186* (2014.11); *H04N 19/30* (2014.11)

(56) References Cited

U.S. PATENT DOCUMENTS

| | | | | |
|---|---|---|---|---|
| 2010/0150231 | A1* | 6/2010 | Huang | H04N 19/61 |
| | | | | 375/E7.243 |
| 2011/0002391 | A1 | 1/2011 | Uslubas | |
| 2013/0089135 | A1* | 4/2013 | Chen | H04N 19/423 |
| | | | | 375/E7.126 |
| 2014/0355676 | A1* | 12/2014 | Seregin | H04N 19/513 |
| | | | | 375/240.12 |
| 2015/0195554 | A1* | 7/2015 | Misra | H04N 19/30 |
| | | | | 375/240.25 |
| 2015/0195573 | A1* | 7/2015 | Aflaki Beni | H04N 19/513 |
| | | | | 375/240.16 |
| 2015/0201204 | A1* | 7/2015 | Chen | H04N 19/30 |
| | | | | 375/240.02 |
| 2015/0264404 | A1* | 9/2015 | Hannuksela | H04N 19/30 |
| | | | | 375/240.16 |
| 2015/0304665 | A1* | 10/2015 | Hannuksela | H04N 19/70 |
| | | | | 375/240.02 |
| 2017/0085917 | A1* | 3/2017 | Hannuksela | H04N 19/136 |
| 2020/0045313 | A1* | 2/2020 | Leleannec | H04N 19/176 |
| 2020/0296396 | A1* | 9/2020 | Wenger | H04N 19/70 |
| 2020/0366888 | A1* | 11/2020 | Seregin | H04N 19/426 |
| 2020/0404279 | A1* | 12/2020 | Choi | H04N 19/139 |

FOREIGN PATENT DOCUMENTS

| | | |
|---|---|---|
| WO | 2019079273 A1 | 4/2019 |
| WO | 2020132358 A1 | 7/2020 |

OTHER PUBLICATIONS

Chen et al. "AHG8: Adaptive Resolution Change". Jul. 2019. (Year: 2019).*
Extended European Search Report in EP 20850658.4, dated May 26, 2023.
AHG19: Adaptive Resolution Change (ARC) support in VVC, Hendry et al., JVET-N0118V1, Mar. 12, 2019, XP030209278.
"[AHG19} On Signaling of Adaptive Resolution Change," Wenger et al., JVET-N0052, Mar. 27, 2019, XP030202788.
Extended European Search Report in EP20849511.9, dated Jul. 10, 2023.
"AHG8: Signaling and Filtering for Reference Picture Resampling (RPR)", Choi et al., JVET-O0332, Jun. 26, 2019, XP030219280.
"AHG8: On adaptive resolution change constraint", He et al, JVET 00184, Jun. 26, 2019, XP030218774.
"Algorithm description for Versatile Video Coding and Test Model 5 (VTM 5)", Chen et al., JVET-N1002, XP030205562.
"Versatile VIdeo Coding (Draft 5)", Bross et al, Apr. 30, 2019, JVET-N1001, XP030205187.
"AHG8: Summary of Resolution Adaptivity related proposals," Wenger et al, JVET-O1040, Jul. 4, 2019, XP030220672.
Extended European Search Report in EP20850635.2, dated Jun. 23, 2023.
"AHG8: Adaptive Resolution Change", Chen et al., Jun. 25, 2019, JVET-0303, XP030219194.
"AHG8: On Adaptive Resolution Change (ARC) High-Level Syntax (HLS)", Samuelsson et al., JVET-0204, Jul. 5, 2018, XP030218839.
"Block Adaptive Super Resolution Video Coding", Siwei et al., Dec. 15, 2009, Advances in Multimedia Information Processing—PCM 2009, Springer Berlin Heiddelberg, pp. 1048-1057, XP019124852.
Extended European Search Report in EP20851174.1, dated Jul. 10, 2023.
"Versatile Video Coding (Draft 6)", Bross et al, JVET-O2001, Jul. 31, 2019, XP030293944.
"AHG8: Scaling window for scaling ratio derivation", Seregin et al, Oct. 10, 2019, JVET-P0590.
"Versatile Video Coding (Draft 10)", Bross et al., Jul. 29, 2020, JVET-S2001, XP030289312.
Extended European Search Report in EP20851175.8, dated Aug. 14, 2023.
"AHG19: Adaptive Resolution Change", Chen et al., JVET-N0279, Mar. 24, 2019, XP030256606.

* cited by examiner

ADAPTIVE RESOLUTION MANAGEMENT SIGNALING

CROSS-REFERENCE TO RELATED APPLICATIONS

This application is a continuation of U.S. patent application Ser. No. 16/948,117, filed on Sep. 3, 2020 and entitled Adaptive Resolution Management Signaling, which in turn claims the benefit of priority of International Application No. PCT/US20/45170, filed on Aug. 6, 2020 and entitled "ADAPTIVE RESOLUTION MANAGEMENT SIGNALING," which claims the benefit of priority of U.S. Provisional Patent Application Ser. No. 62/883,459, filed on Aug. 6, 2019, and titled "ADAPTIVE RESOLUTION MANAGEMENT SIGNALING." Each of U.S. application Ser. No. 16/948,117. International Application No. PCT/US20/45170 and U.S. Provisional Patent Application Ser. No. 62/883,459 is incorporated by reference herein in its entirety.

FIELD OF THE INVENTION

The present invention generally relates to the field of video compression. In particular, the present invention is directed to adaptive resolution management signaling.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of compressed data may conform to a standard video compression specification. Compression may be lossy in that a compressed video lacks some information present in an original video. A consequence of this may include that decompressed video may have lower quality than an original uncompressed video because there is insufficient information to accurately reconstruct the original video.

There may be complex relationships between video quality, amount of data used to represent a video (e.g., determined by a bit rate), complexity of encoding and decoding algorithms, sensitivity to data losses and errors, ease of editing, random access, end-to-end delay (e.g., latency), and the like.

Motion compensation may include an approach to predict a video frame or a portion thereof given a reference frame, such as previous and/or future frames, by accounting for motion of the camera and/or objects in the video. It may be employed in encoding and decoding of video data for video compression, for example in the encoding and decoding using the Motion Picture Experts Group (MPEG)'s advanced video coding (AVC) standard (also referred to as H.264). Motion compensation may describe a picture in terms of the transformation of a reference picture to a current picture. A reference picture may be previous in time when compared to a current picture, and/or from the future when compared to the current picture.

SUMMARY OF THE DISCLOSURE

In an aspect, a decoder includes circuitry configured to determine, using the bit stream, whether an adaptive resolution management mode is enabled, determine, using the bit stream, a scaling factor including a vertical scaling constant component and a horizontal scaling constant component, and reconstruct pixel data of a current block in adaptive resolution management mode and using the determined scaling factor, the reconstructing including scaling the current block horizontally by the horizontal scaling constant component and scaling the current block vertically by the vertical scaling constant component.

In another aspect, a method includes receiving a bit stream, determining, using the bit stream, whether an adaptive resolution management mode is enabled, determining, using the bit stream, a scaling factor including a vertical scaling constant component and a horizontal scaling constant component, and reconstructing pixel data of a current block in adaptive resolution management mode and using the determined scaling factor, the reconstructing including scaling the current block horizontally by the horizontal scaling constant component and scaling the current block vertically by the vertical scaling constant component.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In many current state-of-the-art encoders, resolution is managed by re-coding and re-sending whole portion of the video known as group-of-pictures (GOP). This requires sending the intra-frame (I-frame) which can incur additional costs, since those frames are responsible for the bulk of the bits in the GOP.

Embodiments described in this disclosure relate to Adaptive Resolution Management (ARM), which is a technique that enables additional flexibility for a video encoder/decoder allowing bitrate savings in various use cases. In general, ARM includes performing a prediction using a reference frame of different resolution than a current frame. In current coding standards, reference frames have the same resolution as predicted frames. In ARM, a reference frame may be of a smaller or larger resolution than a frame being predicted. This approach may be used to downscale video resolution, thus reducing bitrate, or upscale video resolution, thus facilitating display characteristics of video playback.

ARM may alternatively or equivalently be referred to for the purposes of this disclosure as reference picture resampling (RPR); RPR and ARM may be used interchangeably.

Some implementations of the current subject matter may include using ARM for any number of frames, at any position within GOP, thus removing requirements for I-frame re-coding.

Figure 1:
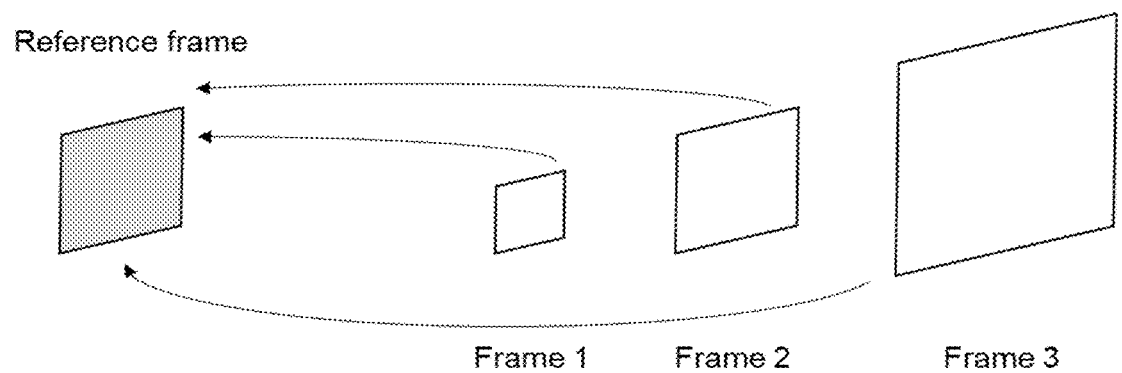
FIG. 1 is an illustration of an example reference frame and example predicted frames of various resolution scales.

FIG. 1 is an illustration of a reference frame and predicted frames of various resolution scales. Frame 1 is smaller (lower resolution) than the reference frame, Frame 2 is of same size (same resolution), while Frame 3 is larger (greater resolution). "Resolution," as used in this disclosure, is a number of pixels in a picture, frame, sub-frame, and/or other displayed area or portion thereof used in video playback, compression, or the like, with a higher number of pixels corresponding to a higher resolution, and a lower number of pixels corresponding to a lower resolution. Resolution may be measured in terms of area, for instance and without limitation by using one or more dimensions of length, measured in pixels that define an area. For instance, a circular sub-frame or other region may have a resolution defined according to a radius. Alternatively or additionally, resolution may be defined by an overall number of pixels.

As an example, and with continued reference to FIG. 1, where reference frame and/or subframe has a geometric form for which area may be defined entirely in terms of two length parameters, such as without limitation a triangular, parallelogram, and/or rectangular form, reference frame and/or subframe may have a resolution W×H, where W and H may indicate a number of pixels describing, respectively, width (or base) and height dimensions of reference frame and/or subframe. Each predicted frame may also have a resolution, which may be determined similarly to resolution of reference frame; for instance, frame 1 may have a smaller resolution WS×HS, frame 2 may have same resolution as reference frame W×H, and frame 3 may have larger resolution WL×HL. Width and height of smaller and larger frames may be obtained by multiplying reference width and height by an arbitrary rescaling constant (Rc), also referred to as a scaling factor and/or constant, which may alternatively or additionally be referred to with a variable name such as RefPicScale. In case of smaller frames, Rc may have a value between 0 and 1. In case of larger frames, Rc may have a value greater than 1; for instance, Rc may have a value between 1 and 4. Other values are possible. Rescaling constant may be different for one resolution dimension than another; for instance, a rescaling constant Rch may be used to rescale height, while another rescaling constant Rcw may be used to rescale width.

Still referring to FIG. 1, ARM may be implemented as a mode. In case of ARM mode activation at some point during decoding, a decoder may have already received a reference frame at a resolution W×H and may rescale a predicted frame using rescaling constant. In some implementations, an encoder may signal to decoder which rescaling constant to use. Signaling may be performed in a sequence parameter set (SPS) corresponding to a GOP containing current picture and/or in a picture parameter set (PPS) corresponding to current picture. For instance, and without limitation, encoder may signal rescaled parameters using fields such as a pps_pic_width_in_luma_samples, pps_pic_height_in_luma_samples, pps_scaling_win_left_offset, pps_scaling_win_right_offset, pps_scaling_win_top_offset, pps_scaling_win_bottom_offset, and/or sps_num_subpics_minus1.

Further referring to FIG. 1, W and H parameters as described above may be represented, without limitation, using variables CurrPicScalWinWidthL and CurrPicScalWinHeightL, respectively; these variables may be derived from signaled parameters as described above using one or more mathematical relationships between the signaled parameters and the variables. For instance, and without limitation, CurrPicScalWinWidthL may be derived according to the following equation:

CurrPicScalWinWidthL=pps_pic_width_in_luma_samples−
SubWidthC*(pps_scaling_win_right_offset+
pps_scaling_win_left_offset)

As a further non-limiting example, CurrPicScalWinHeightL may be derived according to the following equation:

CurrPicScalWinWidthL=pps_pic_width_in_luma_samples−
SubWidthC*(pps_scaling_win_right_offset+
pps_scaling_win_left_offset)

Persons skilled in the art, upon reviewing the entirety of this disclosure, will be aware of various alternative computations that may be used to derive the above-described variables. Encoder may alternatively or additionally signal one or more such variables, Rc, Rch, and/or Rcw directly for instance and without limitation in a PPS and/or SPS.

Alternatively or additionally, and still referring to FIG. 1, a rescaling constant and/or set of rescaling constants as described above may be signaled in a bitstream using a reference to an index of a stored scaling constant and/or constants, and/or of a frame and/or block that was signaled using a previously signaled and/or utilized scaling constant and/or constants. Reference to index of a stored scaling constant may be signaled explicitly and/or determined from one or more additional parameters signaled in bitstream. For instance, and without limitation, decoder may identify a reference frame and/or group of pictures containing a current frame; where a rescaling constant has previously been signaled and/or used in such a group of pictures, with a reference frame signaled as applicable to current frame and/or current group of pictures, or the like, decoder may identify that rescaling constant for use as a rescaling constant with the current frame.

Figure 2:
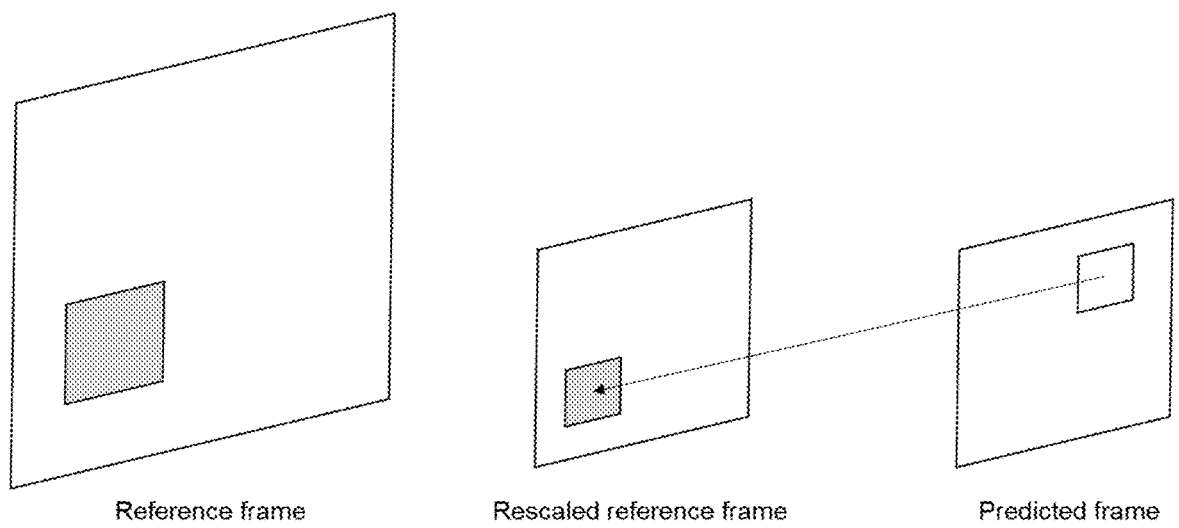
FIG. 2 is an illustration depicting an example reference frame, an example rescaled reference frame, and an example subsequent block prediction process.

In some implementations, and with continued reference to FIG. 1, ARM operation may be executed on a block level of encoded frames. For example, a reference frame may first be rescaled and subsequently prediction may be performed, as depicted in FIG. 2. FIG. 2 is an illustration depicting a reference frame, a rescaled reference frame, and a subsequent block prediction process. Block prediction process may be performed on a scaled reference frame (having a scaled resolution) rather than the original reference frame. Rescaling reference frame may include rescaling according to any parameter signaled by an encoder as described above; for instance and without limitation, where a reference frame to be used with current picture is signaled, such as via a reference to an index value associated with reference frame or the like, the signaled reference frame may be rescaled, prior to prediction, according to any method of rescaling described above; buffer may include a decoded picture buffer (DCB) and/or one or more additional buffers implemented by decoder. A rescaled reference frame may be stored in memory and/or in a buffer, which may include without limitation a buffer identifying frames contained therein by indices, according to which frame retrieval may be performed. Prediction process may include, for example, inter picture prediction including motion compensation.

Still referring to FIG. 2, some implementations of block-based ARM may enable flexibility in applying optimal filters for each block, instead of applying same filter for a whole frame. In some implementations, a skip-ARM mode may be possible such that some blocks (based for example on the uniformity of the pixels and bitrate cost) can be in a skip-ARM mode (such that rescaling would not change the bitrate). Skip-ARM mode may be signaled in a bitstream; for instance, and without limitation, skip-ARM mode may be signaled in a PPS parameter. Alternatively or additionally, decoder may determine that skip-ARM mode is active based on one or more parameters set by decoder and/or signaled in bitstream. Spatial filters used in block-based ARM may include, without limitation, bicubic spatial filters that apply bicubic interpolation, bilinear spatial filters that apply bi-linear interpretation, Lanczos filters that use Lanczos filtering and/or Lanczos resampling using combinations of sinc filters, sinc-function interpolation and/or signal reconstruction techniques, or the like; persons skilled in the art, upon reviewing the entirety of this disclosure, will be aware of various filters that may be used for interpolation consistently with this disclosure. Alternatively or additionally, any luma sample interpolation filtering process may be used. Luma sample interpretation may include computation of an interpolated value at a half-sample interpolation filter index, falling between two consecutive sample values of a non-scaled sample array. Computation of interpolated value may be performed, without limitation, by retrieval of coefficients and/or weights from lookup tables; selection of lookup tables may be performed as a function of motion models of coding units and/or scaling ratio amounts, for instance as determined using scaling constants as described above. Computation may include, without limitation, performing weighted sums of adjacent pixel values, where weights are retrieved from lookup tables. Computed values may alternatively or additionally be shifted; for instance and without limitation, values may be shifted by Min(4, BitDepth−8), 6, Max(2, 14−BitDepth), or the like. Persons skilled in the art, upon reviewing the entirety of this disclosure, will be aware of various alternative or additional implementations that may be used for interpolation filters.

In some implementations, and further referring to FIG. 2 ARM parameters may be signaled by an ARM signal on/off data field, which may be encoded as a single bit, and/or a resolution list, which may include a list of explicit or implicit resolutions allowed in a current session. Parameters signaled using a resolution list may be signaled using an index of a resolution and/or a relative factor of scaling, such a factor from the list ( . . . , 0.25, 0.5, 1.5, 2.0, . . . ) indicating a scale relative to a previous resolution, listed on the resolution list to be used in the current ARM. For instance, and without limitation, ARM on/off signal may be provided in an SPS using sps_ref_pic_resampling_enabled_flag. Alternatively or additionally, a gci_no_ref_pic_resampling_constraint_flag provided in general constraints information may indicate when set to true or '1', that no ARM may be used, regardless of signaling in an SPS and/or PPS.

Further referring to FIG. 2, frames may be rescaled using a scaling constant Rc and/or a plurality of scaling constants. For instance, and without limitation, scaling constant Rch may be applied in a horizontal dimension and the scaling constant Rcv may be applied in a vertical dimension. Rc<1 may be used to reduce data to be encoded and thereby reduce a bitrate of an encoded video. Scaling factors Rch and Rcv may be signaled to decoder, for example, by inclusion in a bit stream, or inclusion of an index to one of a number of predetermined values. When Rch=Rcv, only one value need be signaled to a receiver.

In some implementations, and continuing to refer to FIG. 2, a scaling factor for frames may change in the same sequence of frames. In some implementations, a secondary parameter sequence (SPS) and/or primary parameter sequence (PPS) may be used to signal scaling factors efficiently, for instance as described above. Multiple PPS may be used when multiple scaling factors are used. In some implementations, appropriate PPS may be signaled in a slice and/or tile header to indicate scaling factors used. Applying scaling factors at tile or frame level may offer flexibility to maximize compression performance.

Figure 3:
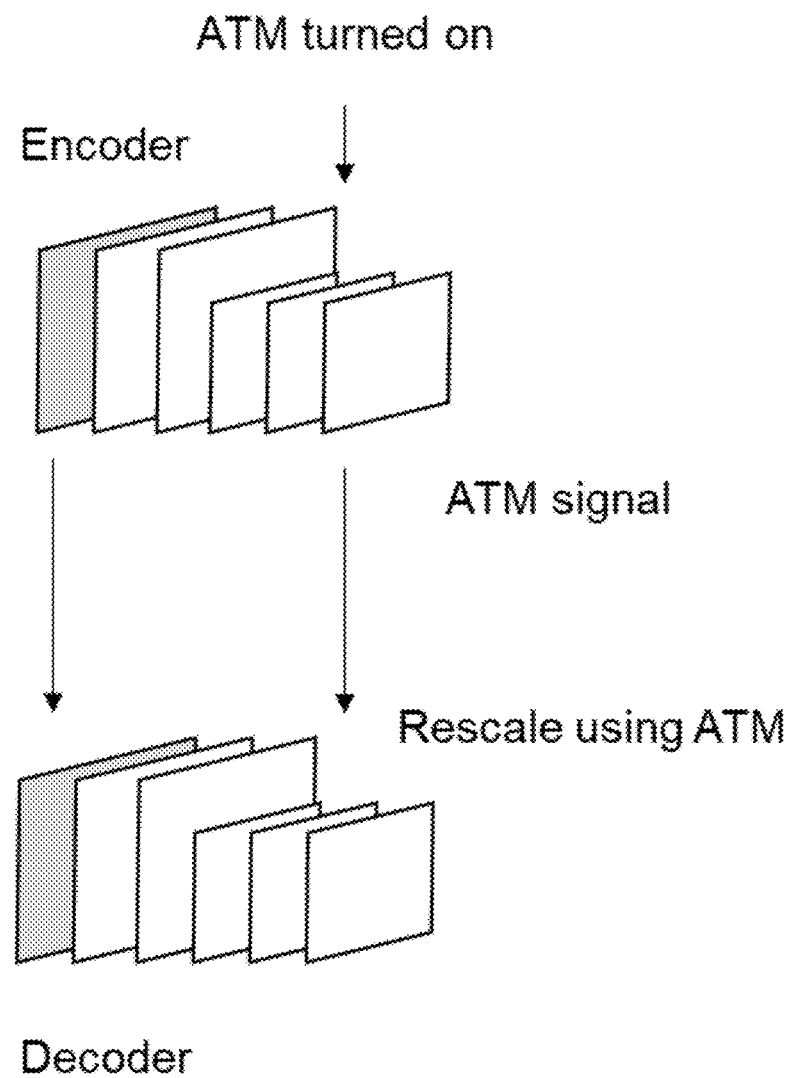
FIG. 3 illustrates example signaling according to some implementations of the current subject matter.

Signaling may be achieved in a non-limiting example by using combination of SPS and PPS. FIG. 3 illustrates example signaling.

Figure 4:
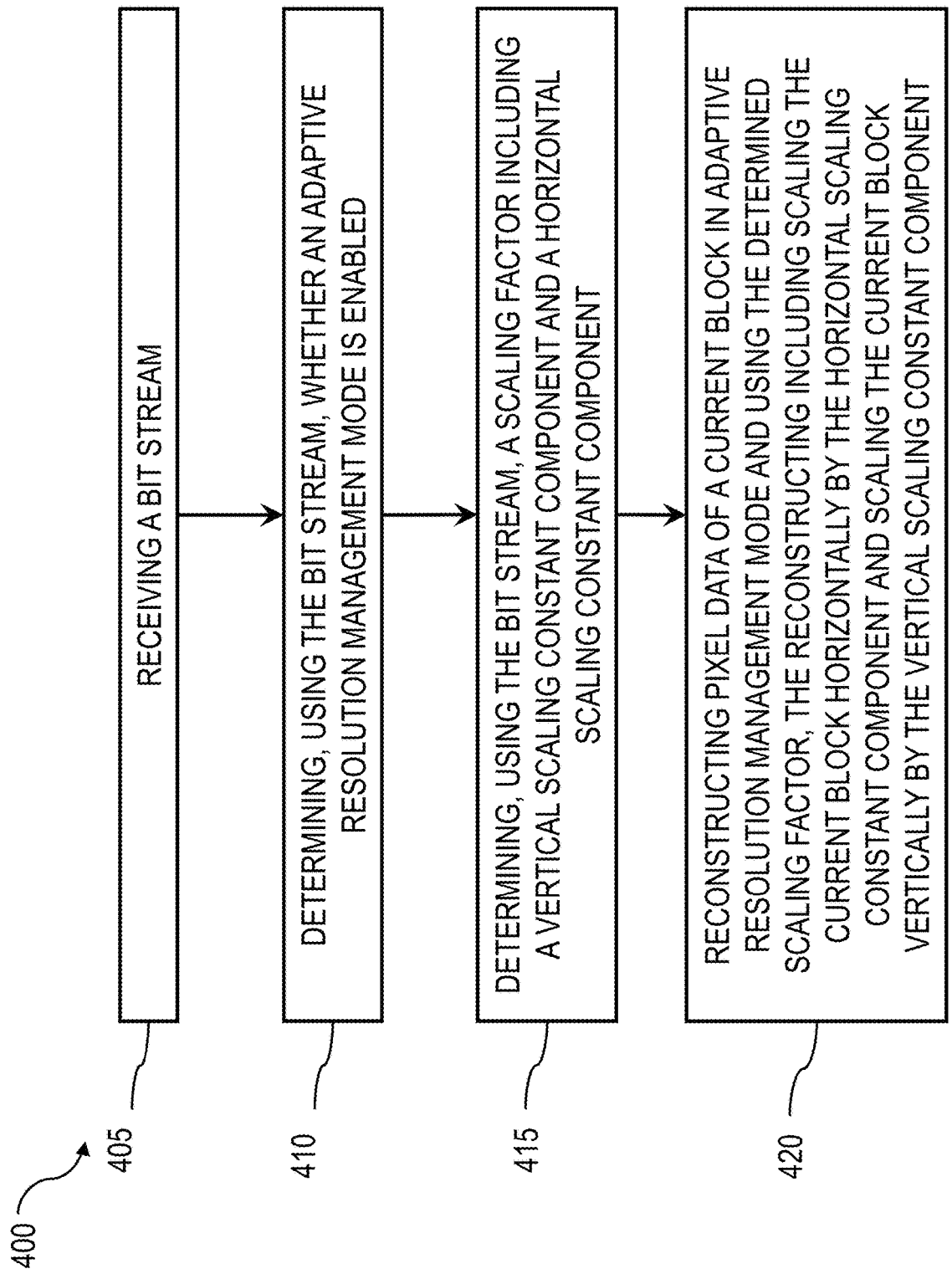
FIG. 4 is a process flow diagram illustrating an example process according to some implementations of the current subject matter.

FIG. 4 is a process flow diagram illustrating an exemplary embodiment of a process 400 of adaptive resolution management that may enable additional flexibility for a video encoder and/or decoder allowing bitrate savings in various use cases.

At step 405, and still referring to FIG. 4, a bit stream may received by a decoder. A current block may be contained within a bit stream that decoder receives. Bit stream may include, for example, data found in a stream of bits that is an input to a decoder when using data compression. Bit stream may include information necessary to decode a video. Receiving may include extracting and/or parsing a block and associated signaling information from bit stream. In some implementations, a current block may include a slice, a tile, coding tree unit (CTU), a coding unit (CU), a prediction unit (PU) and/or any other portion of a frame and/or picture, for instance as described in further detail below.

At 410, and with continued reference to FIG. 4, whether an adaptive resolution management mode is enabled is determined. In some implementations, an adaptive resolution management mode is signaled for a current block by a single bit in the bit stream. Adaptive resolution management mode may be signaled in a picture parameter set (PPS), in a sequence parameter set (SPS), and/or in a slice header or a tile header, for instance as described above.

Still referring to FIG. 4, at step 415, a scaling factor including a vertical scaling constant component and a horizontal scaling constant component may be determined using bit stream; this may be implemented without limitation as described above. Where horizontal scaling constant component is equal to vertical scaling constant component, both may be simultaneously signaled with a single value to be used as each scaling component of horizontal scaling constant component and vertical scaling constant component.

At step 420, and with continued reference to FIG. 4, pixel data of a current block may be reconstructed in adaptive resolution management mode, using determined scaling factor. Reconstructing may include scaling a current block horizontally by horizontal scaling constant component and scaling the current block vertically by vertical scaling constant component.

In some implementations, a resolution list characterizing allowed resolutions may be determined using bit stream. In some implementations, an index into a resolution list characterizing allowed resolutions may be determined.

Figure 5:
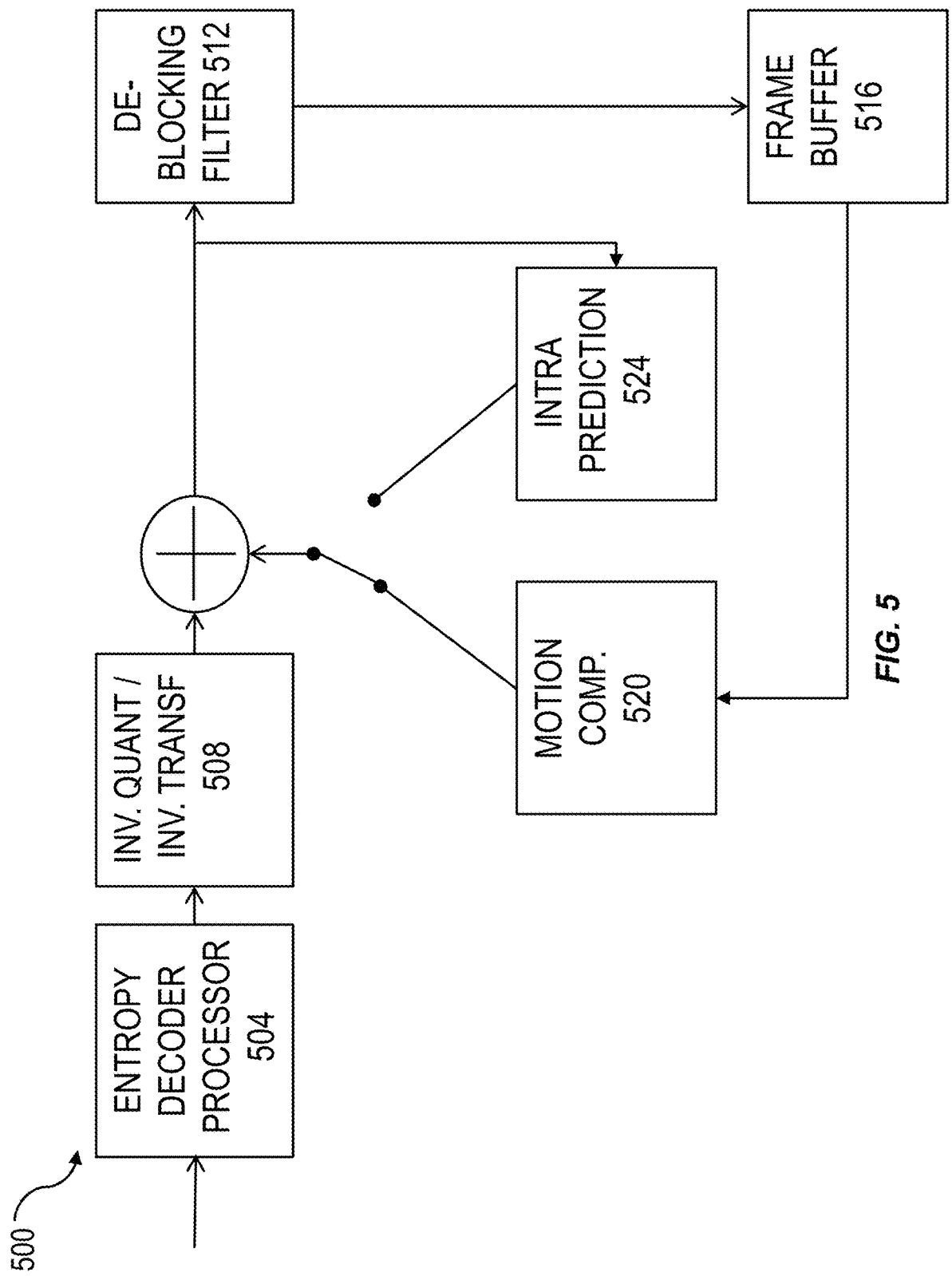
FIG. 5 is a system block diagram illustrating an example decoder capable of decoding a bit stream according to some implementations of the current subject matter.

FIG. 5 is a system block diagram illustrating an example decoder 500 capable of adaptive resolution management signaling as described in this disclosure. Decoder 500 may include an entropy decoder processor 504, an inverse quantization and inverse transformation processor 508, a deblocking filter 512, a frame buffer 516, a motion compensation processor 520 and/or an intra prediction processor 524.

In operation, and still referring to FIG. 5, bit stream 528 may be received by decoder 500 and input to entropy decoder processor 504, which may entropy decode portions of bit stream into quantized coefficients. Quantized coefficients may be provided to inverse quantization and inverse transformation processor 508, which may perform inverse quantization and inverse transformation to create a residual signal, which may be added to an output of motion compensation processor 520 or intra prediction processor 524 according to a processing mode. An output of the motion compensation processor 520 and intra prediction processor 524 may include a block prediction based on a previously decoded block. A sum of prediction and residual may be processed by deblocking filter 512 and stored in a frame buffer 516.

Figure 6:
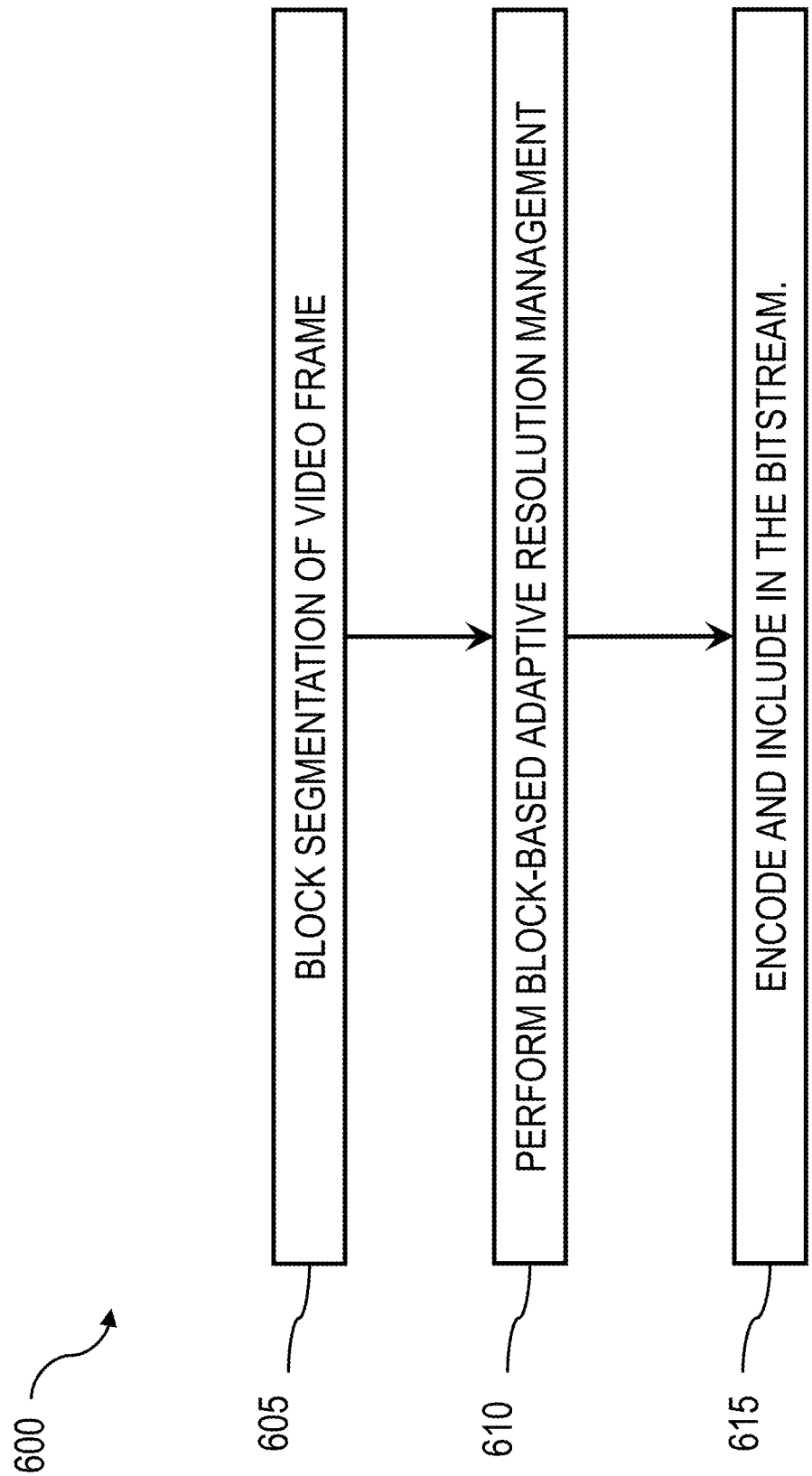
FIG. 6 is a process flow diagram illustrating an example process of encoding a video according to some implementations of the current subject matter.

FIG. 6 is a process flow diagram illustrating an example process 600 of encoding a video with adaptive resolution management that may enable additional flexibility for a video encoder and/or decoder, allowing bitrate savings in various use cases. At step 605, a video frame may undergo initial block segmentation, for example, using a tree-structured macro block partitioning scheme that may include partitioning a picture frame into CTUs and CUs.

At step 610, and still referring to FIG. 6, block-based adaptive resolution management may be performed, including resolution scaling of a frame or portion thereof.

At step 615, and with continued reference to FIG. 6, a block may be encoded and included in bit stream. Encoding may include utilizing inter prediction and intra prediction modes, for example.

Figure 7:
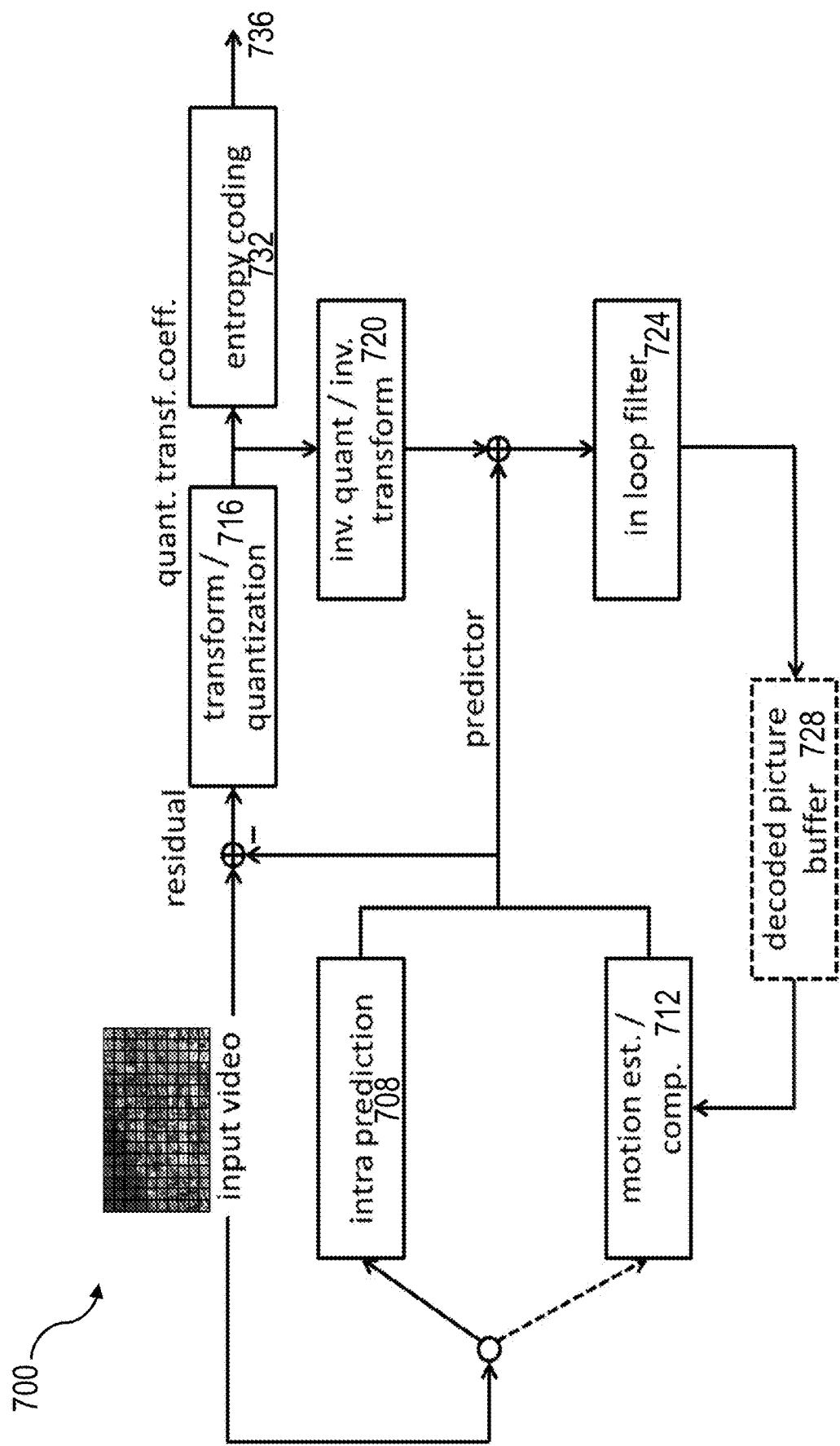
FIG. 7 is a system block diagram illustrating an example video encoder according to some implementations of the current subject matter.

FIG. 7 is a system block diagram illustrating an example video encoder 700 capable of adaptive resolution management signaling as described in this disclosure. Example video encoder 700 may receive an input video 704, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU). A final result of this portioning may include a group of sub-blocks that may be called predictive units (PU). Transform units (TU) may also be utilized.

Still referring to FIG. 7, example video encoder 700 may include an intra prediction processor 708, a motion estimation/compensation processor 712, which may also be referred to as an inter prediction processor, capable of constructing a motion vector candidate list including adding a global motion vector candidate to the motion vector candidate list, a transform/quantization processor 716, an inverse quantization/inverse transform processor 720, an in-loop filter 724, a decoded picture buffer 728, and/or an entropy coding processor 732. Bit stream parameters may be input to the entropy coding processor 732 for inclusion in the output bit stream 736.

In operation, and with continued reference to FIG. 7, for each block of a frame of input video 704, whether to process block via intra picture prediction or using motion estimation/compensation may be determined. Block may be provided to intra prediction processor 708 or motion estimation/compensation processor 712. If block is to be processed via intra prediction, intra prediction processor 708 may perform processing to output a predictor. If block is to be processed via motion estimation/compensation, motion estimation/compensation processor 712 may perform processing including constructing a motion vector candidate list including adding a global motion vector candidate to the motion vector candidate list, if applicable.

Further referring to FIG. 7, a residual may be formed by subtracting a predictor from input video. Residual may be received by transform/quantization processor 716, which may perform transformation processing (e.g., discrete cosine transform (DCT)) to produce coefficients, which may be quantized. Quantized coefficients and any associated signaling information may be provided to entropy coding processor 732 for entropy encoding and inclusion in output bit stream 736. Entropy encoding processor 732 may support encoding of signaling information related to encoding a current block. In addition, quantized coefficients may be provided to inverse quantization/inverse transformation processor 720, which may reproduce pixels, which may be combined with a predictor and processed by in loop filter 724, an output of which may be stored in decoded picture buffer 728 for use by motion estimation/compensation processor 712 that is capable of constructing a motion vector candidate list including adding a global motion vector candidate to the motion vector candidate list.

With continued reference to FIG. 7, although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like).

In some implementations, and still referring to FIG. 7, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding Unit level, a joint-classifier decision tree structure may eliminate unnecessary iterations and control the risk of false prediction. In some implementations, LTR frame block update mode may be available as an additional option available at every leaf node of QTBT.

In some implementations, and still referring to FIG. 7, additional syntax elements may be signaled at different hierarchy levels of bitstream. For example, a flag may be enabled for an entire sequence by including an enable flag coded in a Sequence Parameter Set (SPS). Further, a CTU flag may be coded at a coding tree unit (CTU) level.

Some embodiments may include non-transitory computer program products (i.e., physically embodied computer program products) that store instructions, which when executed by one or more data processors of one or more computing systems, cause at least one data processor to perform operations herein.

Embodiments disclosed herein include decoder having circuitry is configured to receive a bit stream, determine, using the bit stream, whether an adaptive resolution management mode is enabled, determine, using the bit stream, a scaling factor including a vertical scaling constant component and a horizontal scaling constant component, and reconstruct pixel data of a current block in adaptive resolution management mode and using the determined scaling factor, the reconstructing including scaling the current block horizontally by the horizontal scaling constant component and scaling the current block vertically by the vertical scaling constant component.

In embodiments, the adaptive resolution management mode may be signaled for the current block by a single bit in the bit stream. The adaptive resolution management mode may be signaled in a picture parameter set (PPS). The adaptive resolution management mode may be signaled in a sequence parameter set (SPS). The adaptive resolution management mode may be signaled in a slice header or a tile header. The decoder may be further configured to determine, using the bit stream, a resolution list characterizing allowed resolutions. The decoder may be further configured to determine, using the bit stream, an index into a resolution list characterizing allowed resolutions. The decoder may include an entropy decoder processor configured to receive the bit stream and decode the bit stream into quantized coefficients, an inverse quantization and inverse transformation processor configured to process the quantized coefficients including performing an inverse discrete cosine, a deblocking filter, a frame buffer, and an intra prediction processor. The current block may form part of a quadtree plus binary decision tree. The current block may include a coding tree unit. The current block may include a coding unit. The current block may include a prediction unit.

Embodiments disclosed herein may include a method, which may include receiving a bit stream, determining, using the bit stream, whether an adaptive resolution management mode is enabled, determining, using the bit stream, a scaling factor including a vertical scaling constant component and a horizontal scaling constant component, and reconstructing pixel data of a current block in adaptive resolution management mode and using the determined scaling factor, the reconstructing including scaling the current block horizontally by the horizontal scaling constant component and scaling the current block vertically by the vertical scaling constant component.

The adaptive resolution management mode may be signaled for the current block by a single bit in the bit stream. The adaptive resolution management mode may be signaled in a picture parameter set (PPS). The adaptive resolution management mode may be signaled in a sequence parameter set (SPS). The adaptive resolution management mode may be signaled in a slice header or a tile header. The method may include determining, using the bit stream, a resolution list characterizing allowed resolutions. The method may include determining, using the bit stream, an index into a resolution list characterizing allowed resolutions. At least one of the receiving, the determining, and the reconstructing is performed by a decoder that includes an entropy decoder processor configured to receive the bit stream and decode the bit stream into quantized coefficients, an inverse quantization and inverse transformation processor configured to process the quantized coefficients including performing an inverse discrete cosine, a deblocking filter, a frame buffer, and an intra prediction processor. The current block may form part of a quadtree plus binary decision tree. The current block may include a coding tree unit. The current block may include a coding unit. The current block may include a prediction unit.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which may be special or general purpose, coupled to receive data and instructions from, and to transmit data and instructions to, a storage system, at least one input device, and at least one output device. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
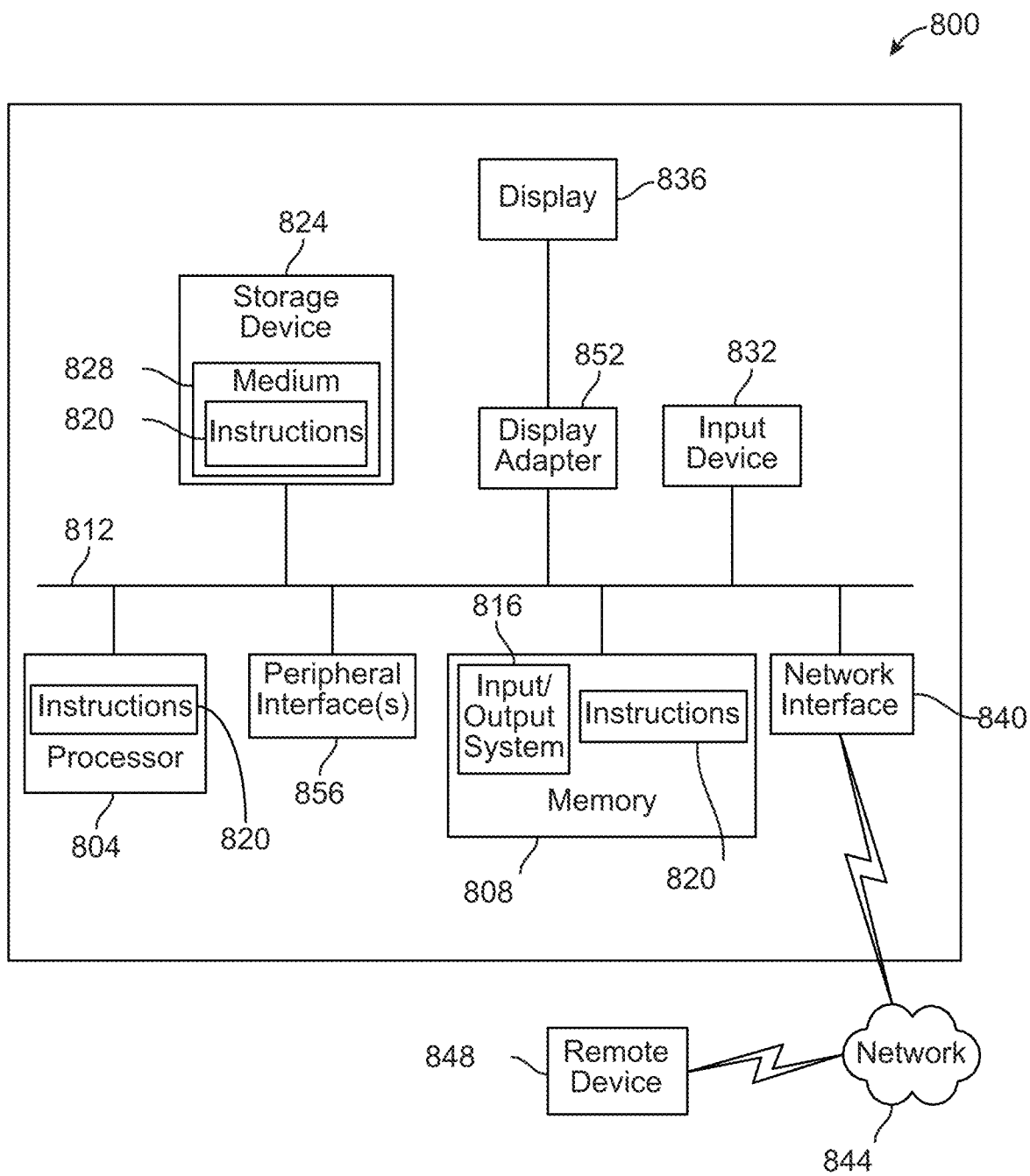
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein. Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A decoder having circuitry configured to:
   receive a bitstream including a first picture to be used as a reference picture, a current picture comprising a first coded block and a second coded block, a signal indicating that a block-based mode when a reference picture and a current picture have different resolutions is enabled, and information including an index useful for determining a scaling constant;
   determine whether the block-based mode is enabled, and if enabled utilizing the mode:
      determine a scaling constant using the information in the bitstream including the index;
      determine a prediction for the first block from the reference picture using the scaling constant and using a filter determined specifically for the prediction for the first block and not determined for the reference picture as a whole;
   utilize the prediction to reconstruct the first block, and without utilizing the mode, reconstruct the second block without using a prediction from a reference picture.

2. The decoder of claim 1 wherein the second block is an intra-coded block.

3. The decoder of claim 1 wherein the scaling constant is a vertical scaling constant.

4. The decoder of claim 1 wherein the scaling constant is a horizontal scaling constant.

5. A decoder having circuitry configured to:
   receive a bitstream including a first picture to be used as a reference picture, a current picture comprising a first inter-coded block and a second intra-coded block, a signal indicating that a block-based mode when a reference picture and a current picture have different resolutions is enabled, and information including an index useful for determining a scaling constant;
   determine whether the block-based mode is enabled, and if enabled utilizing the mode to:
      determine a scaling constant using the information in the bitstream including the index;
      determine a prediction for the first block from the reference picture using the scaling constant and using a filter determined specifically for the prediction for the first block and not determined for the reference picture as a whole;
   utilize the prediction to reconstruct the first block, and reconstruct the second block using intra-prediction.

6. A non-transitory computer readable medium storing a sequence of instructions to configure programmable circuitry in a decoder to:
   receive a bitstream, the bitstream including a first picture to be used as a reference picture, a current picture comprising a first coded block and a second coded block, a signal indicating that a block-based mode when a reference picture and a current picture have different resolutions is enabled, and information including an index useful for determining a scaling constant;
   determine whether the block-based mode is enabled, and if enabled utilizing the mode to:
      determine a scaling constant using the information in the bitstream including the index;
      determine a prediction for the first block from the reference picture using the scaling constant and using a filter determined specifically for the prediction for the first block and not determined for the reference picture as a whole;
   utilize the prediction to reconstruct the first block, and without utilizing the block-based mode, reconstruct the second block without using a prediction from a reference picture.

* * * * *